April 28, 1936.  G. D. RITTER  2,038,681
BRAKE CONTROL
Filed Feb. 26, 1935    2 Sheets-Sheet 1

INVENTOR
GEORGE D. RITTER
BY
Albert L. Ely
ATTORNEY

April 28, 1936.　　　G. D. RITTER　　　2,038,681
BRAKE CONTROL
Filed Feb. 26, 1935　　　2 Sheets-Sheet 2
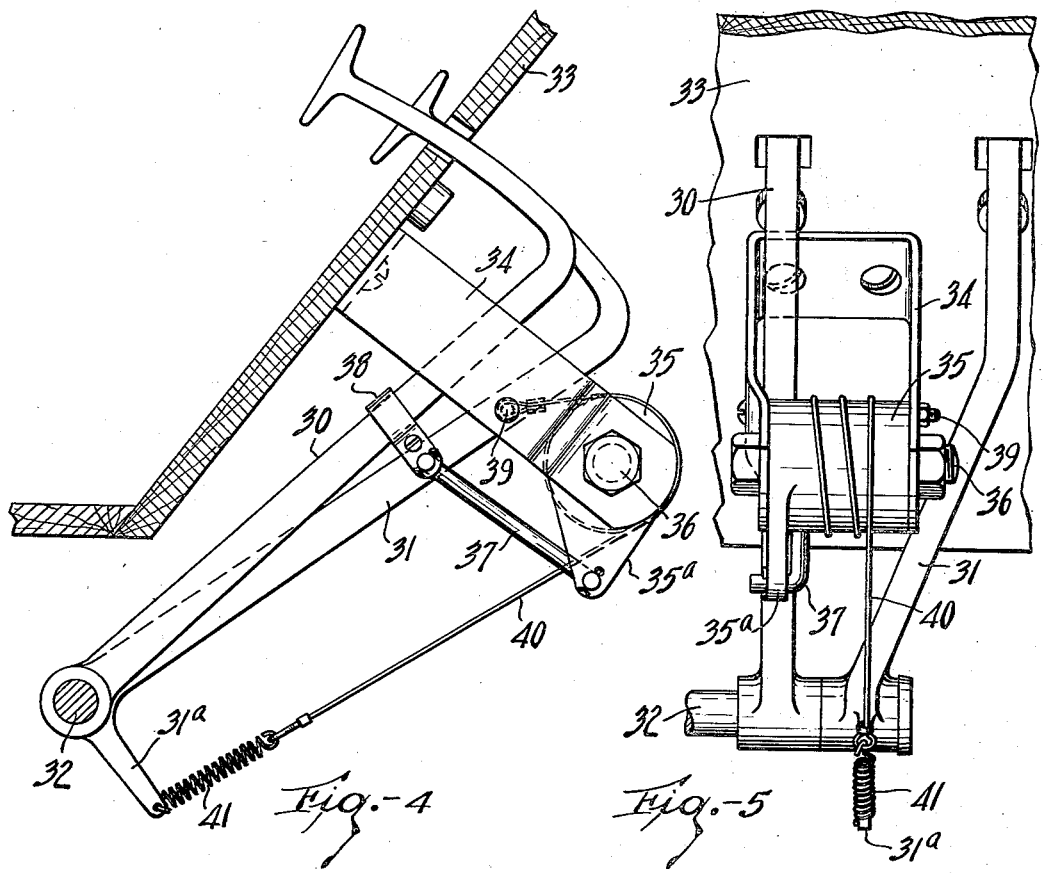
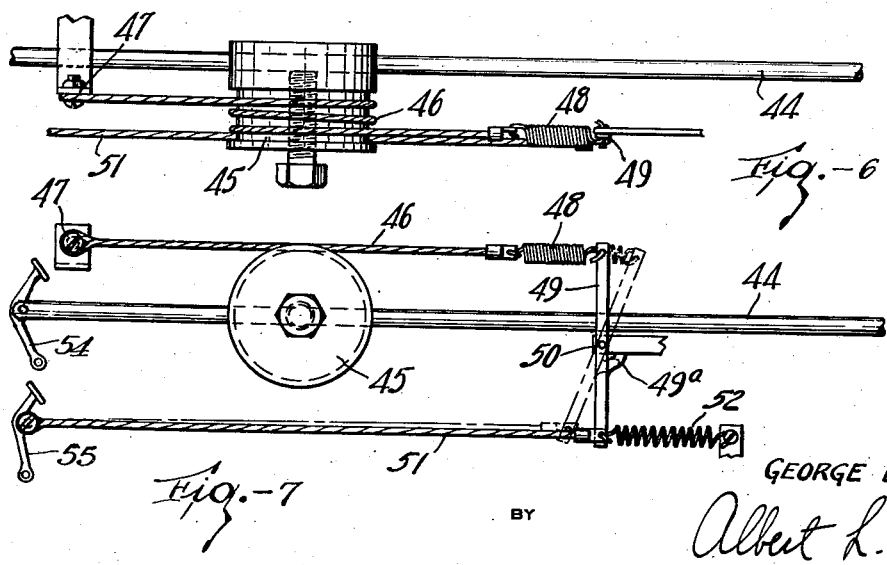
INVENTOR
GEORGE D. RITTER
BY
Albert L. Ely
ATTORNEY Patented Apr. 28, 1936

2,038,681

UNITED STATES PATENT OFFICE 2,038,681

BRAKE CONTROL

George D. Ritter, Uniontown, Ohio

Application February 26, 1935, Serial No. 8,282

9 Claims. (Cl. 192—13)

This invention relates to brake controls for motor driven vehicles, and more especially it relates to automatically operating means for locking the brakes of a vehicle in braking position when another mechanism, for example, the clutch pedal, is operated.

Ordinarily motor vehicles are provided with clutch and brake pedals arranged beside each other to be operated by the respective feet of the driver. Depressing of the brake pedal applies the brakes and depressing of the clutch pedal disengages the clutch. Also it is common practice to provide the clutch pedal with a substantial amount of free travel or lost motion below or beyond the position at which the clutch actually is disengaged.

If the vehicle is stopped on an uphill grade, it is not uncommon for the driver to experience difficulty in holding and re-starting the vehicle. This is true because the tendency of the vehicle to drift backwards down grade makes it necessary for the driver to keep the brake pedal depressed while stopped, and rendering difficult the acceleration or the starting of the motor before releasing the clutch pedal to re-engage the clutch.

The chief objects of the invention are to provide an improved brake control which will permit the brakes of a vehicle to be applied at all times, but will prevent the release of the brakes when said brake control is in operation; and to provide a device of the character mentioned that may be attached to existing models of motor vehicles without alteration of the latter. Further objects include simplicity of construction; efficiency of operation; and cheapness of cost.

The foregoing and other objects are achieved by the use of a movable, preferably rotatable drum having a band or cable wrapped helically therearound, and so arranged that operation of the brake pedal will effect relative movement of the drum and band and operation of the clutch pedal will tighten or loosen the band about the drum, whereby said band or cable may be utilized for applying a snubbing effect upon the drum to prevent said movement thereof under certain conditions. In a vehicle equipped with automatic clutch control mechanism that disengages the clutch without depressing the clutch pedal, the driver may manually operate the clutch pedal to operate the brake control, during periods that the clutch is disengaged by said automatic means, without affecting the operation of said automatic means.

Of the accompanying drawings,

Figure 4 is a side elevation of another embodiment of the invention operatively connected to the clutch and brake pedals of a motor vehicle;

Figure 5 is an elevation of the parts shown in Figure 4 as viewed from the right thereof;

Figure 6 is a somewhat diagrammatic plan view of still another embodiment of the invention; and Figure 7 is a side elevation of the mechanism shown in Figure 6.

Figure 1:
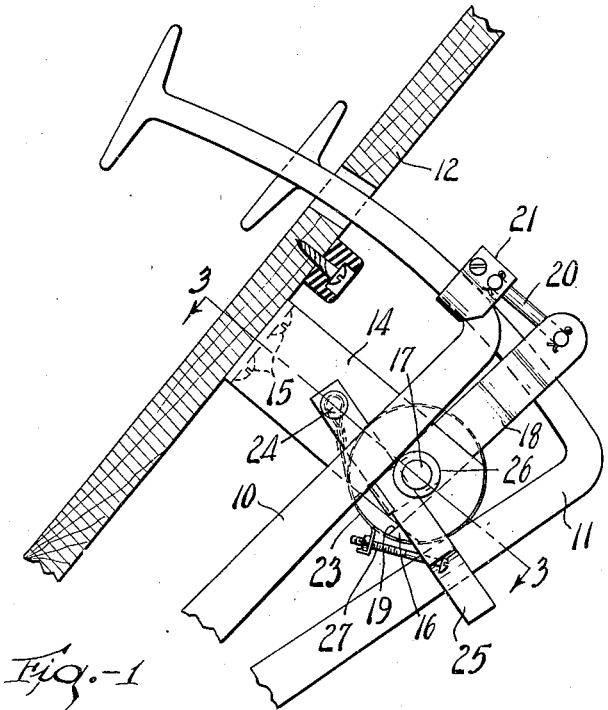
Figure 1 is a side elevation of the brake pedal and clutch pedal of a motor vehicle, and the improved brake control, in its preferred form, operatively associated therewith.
Figure 2:
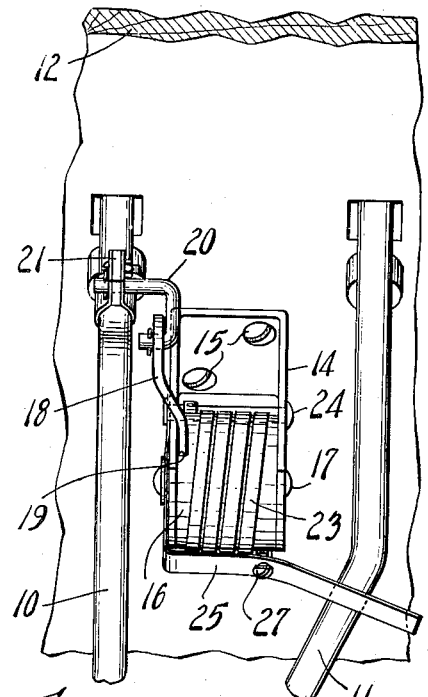
Figure 2 is an elevation of the elements shown in Figure 1, as viewed from the right thereof.
Figure 3:
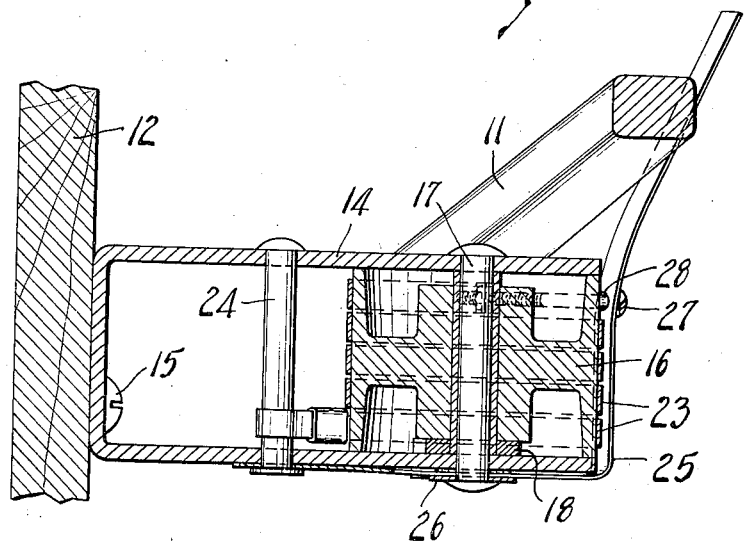
Figure 3 is a section on the line 3—3 of Figure 1.

Referring to Figures 1 to 3 of the drawings, 10 is the brake pedal of a motor vehicle and 11 is the clutch pedal thereof, both of said pedals extending upwardly through respective slots in the toe board 12 of the vehicle in the usual manner. Mounted upon the underside of the said toe board, between the clutch pedal and brake pedal, is the improved brake control comprising a U-shaped metal yoke or bracket 14 that is secured to said toe board by screws 15, 15 that extend through its end wall. Mounted in the open end of the bracket 14 is a rotatable cylinder or drum 16 that is journaled upon a pin or rivet 17 extending from one side of the bracket 14 to the other. A lever 18 also journaled upon the pivot pin 17 and disposed radially of the drum 16 is seated in a transverse slot 19 in one lateral face of the latter, the arrangement being such that the drum may be oscillated by the oscillation of said lever. A link 20 has one end pivotally connected to the free end of lever 18 and has its other end pivotally connected to a suitable fixture or clip 21 that is clamped to the brake pedal 10, whereby movement of the latter causes oscillation or angular rotary movement of the drum 16.

Mounted upon the drum 16 is a snubbing member consisting of a plurality of helical convolutions of metal tape 23, the normal inside diameter of said member being slightly larger than the outside diameter of the drum so that the latter may turn angularly relatively thereto. One end of the tape or strap 23 is permanently secured to an anchorage pin 24 that is secured at its respective ends in the sidewalls of the bracket 14 behind the drum 16. Said pin also serves as one anchorage for a control or operating arm 25, which extends along one lateral face of the bracket 14 and is further secured thereto by means of a washer 26 under the adjacent end of pivot pin 17. The operating arm 25 is composed of spring metal and is bent at right angles across the end of bracket 14, the free end of the arm extending into the path of clutch pedal 11. There is an adjustable connection between the arm 25 and the free end of the snubber tape 23, which connection is shown herein as a bolt 27 that is adjustably secured to said tape and extends freely through an aperture 28 formed in said arm.

The arrangement is such that when the clutch pedal 11 is depressed, as shown in the drawings, said pedal engages arm 25 and so flexes it outwardly as yieldingly to draw the snubber tape 23 tightly about the drum 16. The tape 23 is so wrapped about the drum 16 that said drum may turn in clockwise direction, as shown in Figure 1, at all times, even though the tape is tightened about the drum by the depressing of clutch pedal 11, the springiness of the metal in arm 25 allowing such retraction and loosening of the tape as to permit such movement. The normal looseness of the snubber tape on the drum permits the latter to be oscillated in the counterclockwise direction at any time the clutch pedal is not depressed. When, however, after the drum 23 has been turned clockwise, as by the depressing of the brake pedal 10, as shown, and the clutch pedal is depressed to tighten the tape 23 about the drum, counterclockwise movement of the drum positively is prevented since the friction between the drum and tape is transmitted to the fixed anchorage 24 of the tape.

Thus it will be seen that the invention provides a relatively simple device operating on the snubbing principle adapted to retain the brakes of a vehicle in braking position whenever the clutch pedal is depressed, but which otherwise does not affect the normal operation of the brake and clutch pedals. The invention makes for safety of driving, especially in regions where grades are numerous, and achieves the other objects set out in the foregoing statement of objects.

In the embodiment of the invention shown in Figures 4 and 5, there is a brake pedal 30 and clutch pedal 31 pivotally mounted upon the usual pedal shaft 32, said pedals extending upwardly through respective slots in the toe board 33 of the vehicle. Mounted on the under side of the toe board 33 is a U-shaped yoke or bracket 34 in the open end of which a cylinder or drum 35 is journaled upon a suitable bolt 36. Said drum 35 is formed on one lateral margin with a downwardly extending radial arm 35ª to the free end of which is pivotally connected one end of a link 37, the other end of the latter being pivotally connected to a clip 38 that is clamped upon the brake pedal 30. Mounted in the bracket 34, behind the drum 35, is an anchorage pin 39 to which is fixedly attached one end of an elongate snubber member consisting of a wire or cable 40, the latter being wrapped about the drum 35 in a plurality of adjacent helical convolutions and having its other end connected to one end of a tension spring 41. The other end of tension spring 41 is connected to an arm 31ª that projects radially from the hub portion of clutch pedal 31. The tension spring 41 is so arranged as not to be under tension when the clutch pedal 31 is in normal raised position, thereby causing the snubber cable 40 to engage the drum 35 loosely and permitting the latter to be oscillated in either direction. When the said clutch pedal is depressed, as shown in Figure 4, the spring 41 is put under tension and thus causes the cable 40 yieldingly to grip the said drum, whereby the latter may be rotated counterclockwise by the depressing of brake pedal 30 as shown, but may not be rotated in clockwise direction until the clutch pedal is raised.

The embodiment of the invention shown in Figures 6 and 7 comprises a brake rod 44 that is connected to the usual brake pedal 54 and moved longitudinally toward the left in the setting of a vehicle's brakes and is moved toward the right in the releasing of the brakes. Secured upon the brake rod 44 is a fixture comprising a flanged, cylindrical, non-rotatable drum 45. Wrapped about the drum 45 in a plurality of helical convolutions is a metal wire or cable 46 that has one end secured to a fixed point 47 on the frame of a vehicle. The other end of cable 46 is connected to one end of a tension spring 48 that has its other end connected to one end of a lever 49 that is pivoted intermediate its ends upon a fixed point 50 on the frame of the vehicle. The other end of lever 49 is connected to one end of a cable 51 that is connected at its other end to the usual clutch pedal 55 of the vehicle, the arrangement being such that when the said clutch pedal is depressed to open the clutch the cable 51 is drawn to the left so as to tilt lever 49 to the position shown in broken lines in Figure 7, whereby the cable 46 is yieldingly tightened about drum 45. A tension spring 52 is connected to the same end of lever 49 as cable 51, in opposition to the latter, to restore said lever to the normal position shown in full lines in the drawings when the clutch pedal is in its raised, normal position. The lever 49 may be provided with an offset lug or ear 49ª which will abut a portion of the vehicle frame as shown, when the device is in inoperative position, in which position the spring 48 is not under tension and the cable 46 fits loosely about the drum 45.

When the respective elements of the control are in the inoperative position shown in full lines in the drawings, the brake rod may be moved in either direction since the helical coils of the cable 46 will slip loosely about the drum. When the clutch pedal is depressed, the lever 49 is pulled by the cable 51, against the tension of spring 52 to the position shown in broken lines, whereby the cable 46 is yieldingly tightened about the drum. Then the brake rod 44 may be moved to the left to apply the brakes since the spring 48 will yield sufficiently to allow the cable 46 to slide about the drum 45, but said rod cannot be moved to the right to release the brakes because the resultant pull on the cable tightens the latter about the drum because of its fixed anchorage at the point 47.

In all of the embodiments shown and described the connection between the clutch pedal and the brake control device preferably is so arranged that it functions only during the clutch pedal's free travel or lost motion beyond the point where the clutch is disengaged so that it in nowise alters or interferes with the normal operation of the vehicle, and the brake always will be released before the clutch is engaged.

Other modifications may be resorted to without departing from the spirit of the invention or the scope of the appended claims, which are not limited wholly to the specific construction shown.

What is claimed is:

1. In combination with the clutch pedal and the brake pedal of a motor vehicle, a brake control comprising a drum, a snubbing member wrapped about the drum, means connecting said snubbing member with the clutch pedal for varying the tension of the snubbing member about the drum, and means connecting the brake pedal to the drum for causing relative movement between the drum and the snubbing member.

2. In combination with the clutch pedal and the brake pedal of a motor vehicle, a brake control comprising a drum, a snubbing member coiled helically about said drum and having one end secured to a fixed point, resilient means so interposed between the other end of the snubbing member and the clutch pedal that operation of the latter yieldingly tightens the snubbing member about the drum, and means connecting the brake pedal to the drum for causing relative movement between the drum and snubbing member when said brake pedal is operated.

3. In combination with the clutch pedal and the brake pedal of a motor vehicle, a brake control comprising a pivotally mounted drum, a snubbing member coiled helically about said drum having one end secured to a fixed point, resilient means so interposed between the other end of the snubbing member and the clutch pedal that operation of the latter yieldingly tightens the snubbing member about the drum, and means connecting the brake pedal to the drum for oscillating the latter.

4. In combination with the clutch pedal and the brake pedal of a motor vehicle, a brake control comprising a pivotally mounted drum, a snubbing member coiled helically about said drum and having one end secured to a fixed point, a resilient leaf spring to which the other end of said snubbing member is connected, said leaf spring extending into the operative path of the clutch pedal whereby depressing of the latter engages and flexes said leaf spring and thereby yieldingly tightens the snubbing member about the drum, and means connecting the brake pedal to the drum for causing angular movement of the latter.

5. A combination as defined in claim 4 including an adjustable member between the snubbing member and the leaf spring.

6. In combination with the clutch pedal and the brake pedal of a motor vehicle, a brake control comprising a pivotally mounted drum, a helical coil of strip material about the perimeter of said drum, one end of said strip material being attached to a fixed point on the vehicle, a tension spring connecting the other end of said strip material to said clutch pedal whereby depressing of the latter yieldingly tightens the helical coil about the drum, and a connection between the brake pedal and the drum for causing angular movement of the latter when the brake pedal is operated.

7. In combination with the clutch pedal and the brake pedal of a motor vehicle, a brake control comprising a drum, a helical coil in frictional contact with the perimeter of said drum, one end of said coil being anchored to a fixed point, means for applying an elastic tension to the other end of said coil when the clutch pedal is depressed, and means for moving the drum relatively of said coil when the brake pedal is operated.

8. In a motor vehicle, a brake rod movable longitudinally by operation of the brake pedal thereof, a drum non-rotatably mounted on said brake rod and moving therewith, a strip of snubbing material wound helically about said drum, one end of said snubbing material being secured to a fixed point, and means connecting the other end of said snubbing material to the clutch pedal of the vehicle whereby operation of the latter will tighten the snubbing material about the drum.

9. In a brake control device, the combination of a bracket adapted to be secured to the structure of a motor vehicle, a drum journaled in said bracket, a snubbing member disposed helically about said drum and having one end secured to a fixed point on the bracket, elastic means for connecting the other end of the snubbing member to the clutch mechanism of the motor vehicle whereby the latter is adapted yieldingly to tighten said member about the drum, and means for connecting the drum to the brake mechanism of the vehicle whereby the drum is oscillated when said brake mechanism is operated.

GEORGE D. RITTER.